I. B. FLYNN.
GAGE COCK.
APPLICATION FILED MAR. 7, 1913.
1,190,277. Patented July 11, 1916.
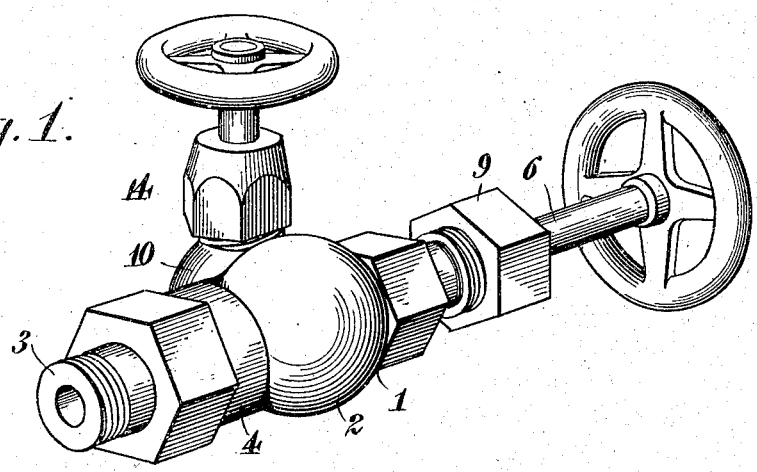
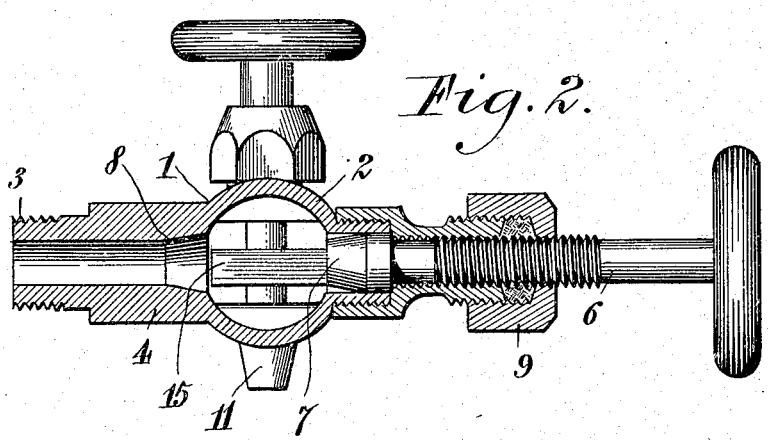
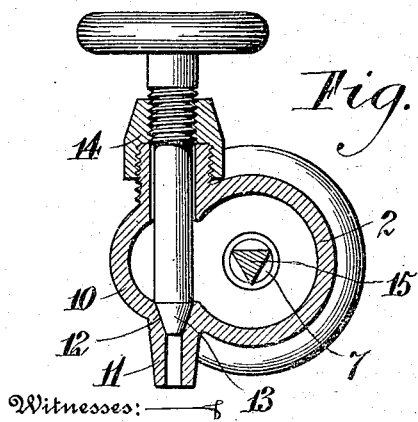
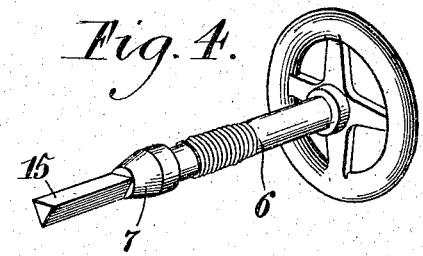
Witnesses:
Christ Feinle, Jr.
John J. McCarty
Inventor,
Ira B. Flynn.
By Victor J. Evans,
Attorney.

UNITED STATES PATENT OFFICE.

IRA B. FLYNN, OF PITTSBURG, KANSAS.

GAGE-COCK.

1,190,277.  Specification of Letters Patent.  Patented July 11, 1916.

Application filed March 7, 1913. Serial No. 752,736.

*To all whom it may concern:*

Be it known that I, IRA B. FLYNN, a citizen of the United States, residing at Pittsburg, in the county of Crawford and State of Kansas, have invented new and useful Improvements in Gage-Cocks, of which the following is a specification.

This invention relates to certain novel and useful improvements in gage cocks for steam boilers.

In carrying out the present invention, it is my purpose to provide what may be styled a combination cock wherein the passage for the fluid is at all times maintained open and free from corrosion and in which the testing valve may be reground irrespective of any water or steam within the boiler.

It is also my purpose to provide a gage cock which will embrace the desired features of simplicity, efficiency and durability coupled with cheapness of cost in manufacture and installation and which will be in the form of duplex valve structure, including main and auxiliary valves, so that either valve may be opened independently of the other and without permitting the escape of water and steam.

With the above and other objects in view, the invention consists in the construction, combination and arrangement of parts hereinafter set forth in and falling within the scope of the claim.

In the accompanying drawing; Figure 1 is a perspective view of a gage cock constructed in accordance with my present invention. Fig. 2 is a longitudinal sectional view therethrough. Fig. 3 is a cross sectional view, and Fig. 4 is a detail perspective view of the main valve.

Referring now to the accompanying drawing in detail, the numeral 1 designates the body of the valve, said body being formed with an outwardly bulged central portion 2 in open communication at one end with a threaded nipple 3 adapted to be threaded into the boiler shell and at its opposite end with a sleeve 4 having the inner wall thereof screw threaded to engage the threaded portion of the valve stem 6 of the main valve, said stem extending through the sleeve 4 and having the inner ends thereof formed to provide a valve 7 adapted to engage a seat 8 formed on the inner end of the nipple 3. Threadedly engaging the outer end of the sleeve 4 is a packing or gland nut 9 adapted to form a fluid tight joint.

In open communication with the chamber formed by the outwardly bulged portion 2 of the body 1 and arranged to one side of the valve stem 6 is a dome 10 provided at one point with a discharge nipple 11 forming at its junction with the dome a seat 12 adapted to be engaged by a valve 13 threadedly engaging a sleeve 14 formed on the dome at a point diametrically opposite the discharge nipple 11, the stem of the valve 13 being disposed at right angles to the stem 6.

In order that the fluid passage in the nipple 3 between the boiler and the valve body may be at all times kept clean and free of corrosion incident to scale and the like, I form on the valve end of the stem 6 an axial shank 15 adapted, when the valve is seated, to rest within the passage in the nipple. This shank or cleaner is preferably of non-circular outline and, in the present instance, is shown to be of triangular cross section, the edges being adapted to wipe against the wall of the passage to remove any scale therefrom.

From the foregoing description taken in connection with the accompanying drawing, the construction, mode of operation and manner of employing my invention will be readily apparent. When it is desired to regrind the valve 13, or the seat of such valve, the main valve 6 is moved to a closed position thereby cutting off communication between the interior of the boiler and the atmosphere, while the valve 13 is removed. On the other hand, should it be desired to clean the passage in the nipple 3, the valve 13 is engaged with its seat so as to prevent the escape of fluid from the boiler, while the valve stem 6 is rotated to actuate the shank 16 and so remove any sediment from the wall of the fluid passage.

In the normal condition of the gage cock, the main valve, that is to say, the valve 8 is in open position, while the testing or auxiliary valve, that is the valve 13, is closed. Now, when it is desired to ascertain the water or steam line in the boiler, the testing valve is opened whereby water or steam as the case may be will escape.

It will be noted that I have provided a gage cock embodying a duplex valve structure whereby both valves may be operated independently of each other and wherein the fluid passage will be at all times clean and free of sediment, and the testing valve seat readily ground.

I claim:

A gage cock for boilers comprising a body formed with a spherical chamber and a passage communicating with said chamber, an approximately semi-spherical chamber of less capacity than said spherical chamber and communicating therewith at a point above the bottom of said spherical chamber, the centers of said chambers being in horizontal alinement, a main valve passing centrally through said first chamber for obstructing said passage, a discharge nipple communicating with said second chamber and an auxiliary valve for closing the passage in said nipple and threaded into the casing at a point remote from said nipple, the axis of the nipple passage being arranged in a right angular direction with relation to the axis of the passage in said body.

In testimony whereof I affix my signature in presence of two witnesses.

IRA B. FLYNN.

Witnesses:
W. EVAN DAVIS,
O. G. HENDERLIDER.

Copies of this patent may be obtained for five cents each, by addressing the "Commissioner of Patents, Washington, D. C."